United States Patent
Cromer et al.

(10) Patent No.: US 6,526,507 B1
(45) Date of Patent: Feb. 25, 2003

(54) DATA PROCESSING SYSTEM AND METHOD FOR WAKING A CLIENT ONLY IN RESPONSE TO RECEIPT OF AN AUTHENTICATED WAKE-ON-LAN PACKET

(75) Inventors: Daryl Carvis Cromer, Cary, NC (US); Brandon Jon Ellison, Raleigh, NC (US); Eric Richard Kern, Durham, NC (US); Howard Locker, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/252,362

(22) Filed: Feb. 18, 1999

(51) Int. Cl.⁷ .............................. H04L 9/12; H04L 9/30; G06F 13/10; G06F 13/14
(52) U.S. Cl. ................. 713/162; 713/201; 713/323; 713/229; 713/300; 713/310; 713/320; 709/203; 709/204; 709/225; 709/216; 709/218; 709/227; 370/260; 370/311; 370/389; 370/392; 370/431; 370/468
(58) Field of Search ............................ 709/224, 219, 709/227, 203; 713/200, 201, 202, 300, 310, 320, 321, 322, 323

(56) References Cited

U.S. PATENT DOCUMENTS

| | | | |
|---|---|---|---|
| 4,262,329 A | | 4/1981 | Bright et al. |
| 4,423,287 A | | 12/1983 | Zeidler |
| 4,493,028 A | | 1/1985 | Heath |
| 4,839,504 A | | 6/1989 | Nakano |
| 4,882,779 A | | 11/1989 | Rahtgen |
| 5,369,704 A | | 11/1994 | Bennett et al. |
| 5,438,436 A | | 8/1995 | Harris |
| 5,499,298 A | | 3/1996 | Narasimhalu et al. |
| 5,615,264 A | | 3/1997 | Kazmierczak et al. |
| 5,715,164 A | | 2/1998 | Liechti et al. |
| 5,740,246 A | | 4/1998 | Saito |
| 6,101,608 A | * | 8/2000 | Schmidt et al. .............. 713/202 |
| 6,115,817 A | * | 9/2000 | Whitmire ..................... 713/171 |
| 6,119,228 A | * | 9/2000 | Angelo et al. .............. 713/180 |
| 6,311,276 B1 | * | 10/2001 | Connery et al. ............ 713/201 |

* cited by examiner

Primary Examiner—Gail Hayes
Assistant Examiner—Taghi T. Arani
(74) Attorney, Agent, or Firm—Bracewell and Patterson (57) ABSTRACT

A data processing system and method including a server computer system coupled to a client computer system utilizing a network are described for causing an initially powered-off client computer system to power-on only in response to a receipt of an authenticated wake network packet. The client computer system is capable of receiving a wake network packet while the client is powered-off. The client computer system determines if the received wake network packet is a valid wake network packet while the client is powered-off. The client computer system powers-on only in response to a determination that the wake network packet is a valid wake network packet. The client computer system powers-on only in response to authenticated wake network packets.

18 Claims, 7 Drawing Sheets

DATA PROCESSING SYSTEM AND METHOD FOR WAKING A CLIENT ONLY IN RESPONSE TO RECEIPT OF AN AUTHENTICATED WAKE-ON-LAN PACKET

BACKGROUND OF THE INVENTION

1. Field of the Invention

The present invention relates in general to data processing systems and, in particular, to a data processing system and method including a server and client computer system coupled together utilizing a network. Still more particularly, the present invention relates to a data processing system and method including a server and client computer systems coupled together utilizing a network for causing the client to be powered-on only in response to a receipt of an authenticated wake network packet.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

With PCs being increasingly connected into networks to allow transfers of data among computers to occur, more operations such as maintenance, updating of applications, and data collections are occurring over the network. Computer networks are also becoming essential to their users. It is desirable to minimize loss of productivity by increasing availability of network resources. In today's networked world, the availability and performance of the network is as important as the availability and performance of the personal computer.

One known method for managing a networked system is the ability of a computer system to cause an initially powered-off client computer system on the network to power-up. This method is commonly called "Wake-on-LAN". This method permits a server, or any other computer system on the network, to cause a client on the network to power-up by transmitting a Wake-on-LAN packet. The ability of any computer system to wake another is both an advantage and disadvantage. It may be undesirable to permit any computer system to be able to wake another indiscriminately.

Encryption standards are known in the art to ensure that only the intended recipient of a message may read and access the message. One known standard for encoding and decoding messages is the TCP/IP standard version 6. This standard is a mechanism for providing packet security.

Encryption algorithms are known. One known encryption algorithm is an asymmetric, or public key, algorithm. RSA is an example of such an algorithm. The public key algorithm is a method for encrypting messages sent from a first computer system to a second computer system. This algorithm provides for a public key and a private key pair for each computer system which is unique to each computer system. Each computer system has its own associated public and private key pair which is stored within that computer system.

Prior to the first computer system transmitting a message, the first computer system obtains the public key of the intended recipient of the message, in this case the second computer system. The public key of the second system is obtained by the first computer system from the second computer system. The first computer system then encrypts the message using its private key and the public key of the second computer system. The message is then transmitted to the computer identified by the public key, i.e. the second computer system. Upon receipt of the message, the second computer utilizes its private key and the public key from the first computer system to decode the message.

Therefore a need exists for a data processing system and method for causing a client computer system to be powered-on only in response to a receipt of an authenticated wake network packet.

SUMMARY OF THE INVENTION

A data processing system and method including a server computer system coupled to a client computer system utilizing a network are described for causing an initially powered-off client computer system to power-on only in response to a receipt of an authenticated wake network packet. The client computer system is capable of receiving a wake network packet while the client is powered-off. The client computer system determines if the received wake network packet is a valid wake network packet while the client is powered-off. The client computer system powers-on only in response to a determination that the wake network packet is a valid wake network packet. The client computer system powers-on only in response to authenticated wake network packets.

The above as well as additional objectives, features, and advantages of the present invention will become apparent in the following detailed written description.

DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DESCRIPTION OF A PREFERRED EMBODIMENT

A preferred embodiment of the present invention and its advantages are better understood by referring to FIGS. 1–7 of the drawings, like numerals being used for like and corresponding parts of the accompanying drawings.

The present invention is a method and system for causing an initially powered-off client computer system to power-on only in response to authenticated wake network packets. The client includes an encryption processor which receives Wake-on-LAN network packets. When the client computer system is powered-off, the encryption processor analyzes each received network packet to determine whether the packet is a valid wake packet. When the client is powered-on, the encryption processor does not alter any network traffic.

The encryption processor determines whether each received packet is a valid wake packet by determining whether the packet has been encrypted. If the packet is an encrypted wake packet, the encryption processor will accept and process the packet, thus resulting in the client computer system being powered-on. If the packet is not an encrypted wake packet, the encryption processor will ignore the packet.

The encryption processor receives an encryption signal indicating whether the client computer system is powered-on or off. In one embodiment, the power supply generates the encryption signal. In a second embodiment, a service processor included within the client generates the signal.

Figure 1:
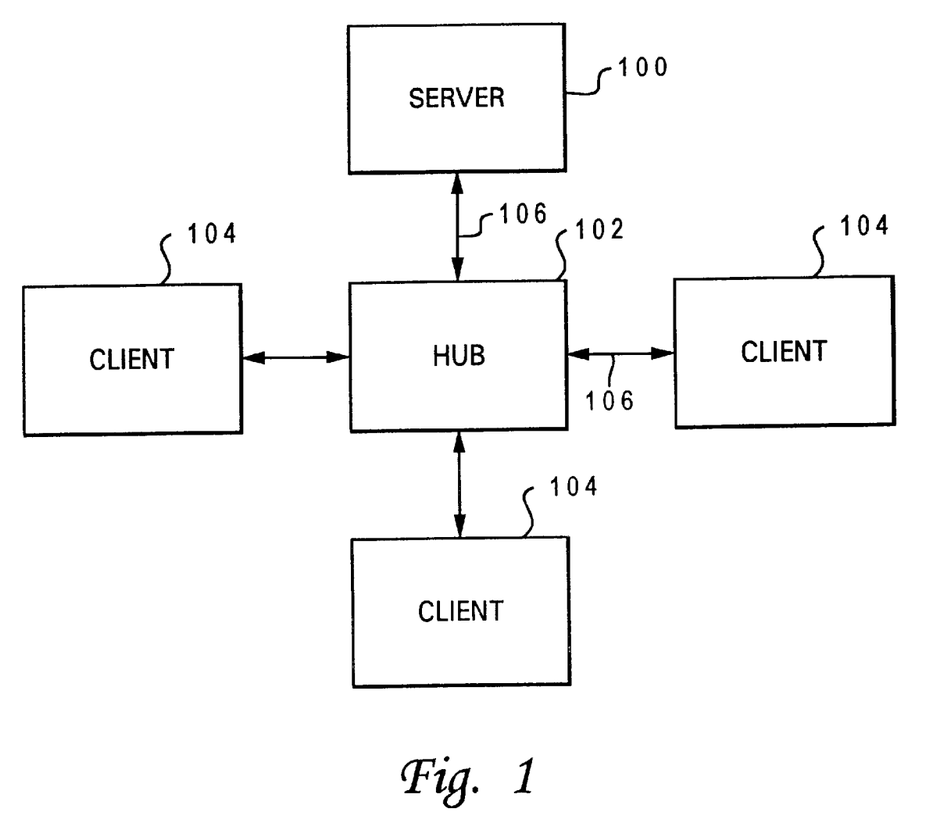
FIG. 1 illustrates a pictorial representation of a data processing system including a plurality of client computer systems coupled to a server computer system utilizing a network and a hub in accordance with the method and system of the present invention.

FIG. 1 illustrates a pictorial representation of a data processing system including a plurality of client computer systems 104 coupled to a server computer system 100 utilizing a hub 102 in accordance with the method and system of the present invention. Server computer system 100 is connected to a hub 102 utilizing a local area network (LAN) connector bus 106. Respective client systems 104 also connect to hub 102 through respective LAN busses 106. The preferred form of the network conforms to the Ethernet specification and uses such hubs. It will be appreciated, however, that other forms of networks, such as token ring, may be utilized to implement the invention.

A "network" may include any type of data communications channel, such as an Ethernet network, token ring, X.10, or X.25. Those skilled in the art will recognize that the invention described herein may be implemented utilizing any type of data communications channel. However, the preferred embodiment is implemented utilizing an Ethernet network.

Figure 2:
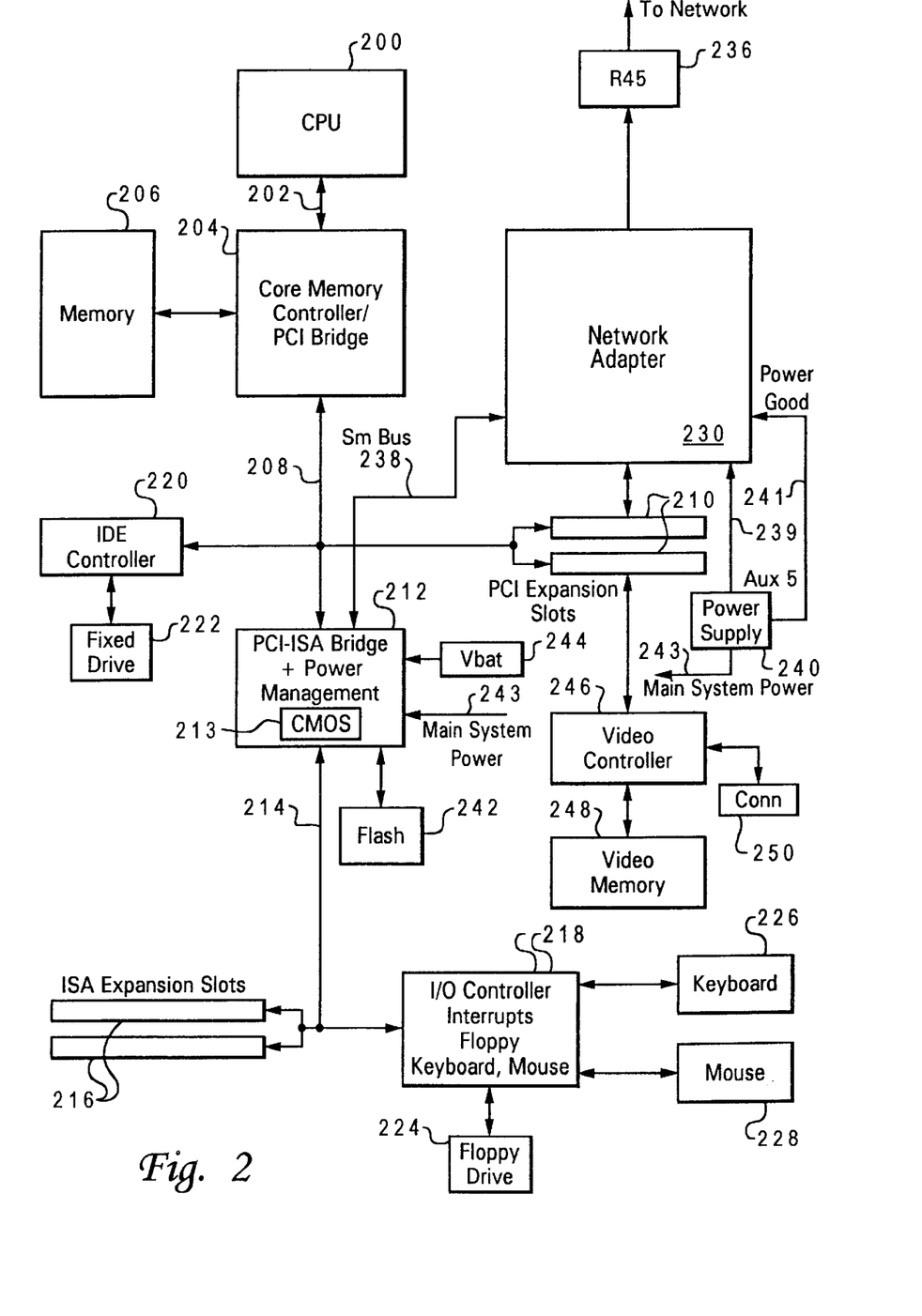
FIG. 2 depicts a pictorial representation of a processor and a network adapter included within a client computer system in accordance with the method and system of the present invention.

FIG. 2 illustrates a pictorial representation of a network adapter 230 included within a client computer system in accordance with the method and system of the present invention. A central processing unit (CPU) 200 is connected by address, control, and data busses 202 to a memory controller and peripheral component interconnect (PCI) bus bridge 204 which is also coupled to system memory 206. An integrated drive electronics (IDE) device controller 220 and a PCI bus to Industry Standard Architecture (ISA) bus bridge 212 are connected to PCI bus bridge 204 utilizing PCI bus 208. IDE controller 220 provides for the attachment of IDE compatible storage devices such as fixed disk drive 222. PCI/ISA bridge 212 provides an interface between PCI bus 208 and an optional feature or expansion bus such as the ISA bus 214. PCI/ISA bridge 212 includes power management logic. A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

PCI-ISA bridge controller 212 includes an interface for a flash memory 242, which includes microcode which client 104 executes upon power-on. Flash memory 242 is an electrically erasable programmable read only memory (EEPROM) module and includes BIOS that is used to interface between the I/O devices and operating system. PCI-ISA bridge controller 212 also includes CMOS storage 213 that holds initialization settings which represent system configuration data. Storage 213 includes values which describe the present configuration of client 104. For example, storage 213 includes information describing the list of initial program load (IPL) devices set by a user and the sequence to be used for a particular power method, the type of display, the amount of memory, time date, etc. Furthermore, this data is stored in storage 213 whenever a special configuration program, such as configuration/setup is executed. PCI-ISA bridge controller 212 is supplied power from battery 244 to prevent loss of configuration data in storage 213.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

Client system 104 includes a video controller 246 which may, for example, be plugged into one of connector slots 210. Video controller 246 is connected to video memory 248. The image in video memory 248 is read by controller 246 and displayed on a monitor (not shown) which is connected to client 104 through connector 250.

A client system 104 includes a network adapter 230 which may, for example, be plugged into one of the PCI connector slots 210 (as illustrated) or one of the ISA connector slots 216 in order to permit client 104 to communicate with a LAN via connector 236 to hub 102.

Client computer system 104 includes a special power supply 240 which supplies full normal system power 243, and has an auxiliary power main AUX 5 239 which supplies full time auxiliary power to the power management logic 212, ASIC 300, and to the network adapter 230. This enables client 104 to respond to a wakeup signal from network adapter 230. In response to a receipt of the wakeup signal, power supply 240 is turned on and then powers up client 104.

Figure 3A:
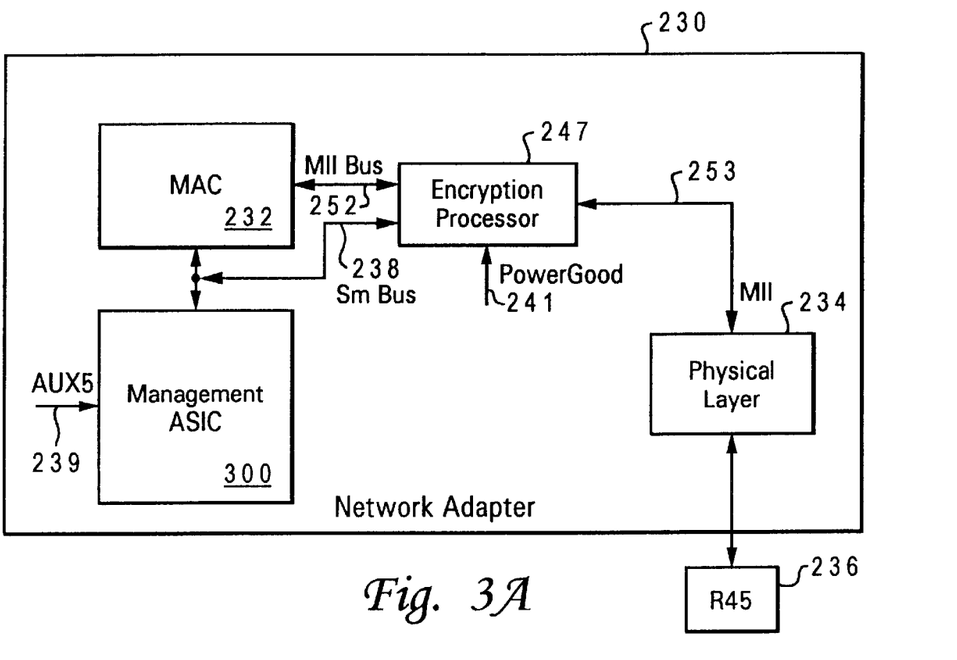
FIG. 3A illustrates a more detailed pictorial representation of a first embodiment of the network adapter of FIG. 2 in accordance with the method and system of the present invention.

FIG. 3A illustrates a more detailed pictorial representation of a first embodiment of the network adapter of FIG. 2 in accordance with the method and system of the present invention.

Network adapter 230 includes a physical layer 234, media access controller (MAC) 232, encryption processor 247, and a special purpose service processor 300. Physical layer 234 and a media access controller (MAC) 232 are connected together utilizing a Media Independent Interface (MII) bus 253. Encryption processor 247 is coupled to MAC utilizing a separate MII bus 252. Encryption processor 247, MAC 232, and management ASIC 300 are also coupled together utilizing SM bus 238. The MII bus is a specification of signals and protocols which define the interfacing of a 10/100 Mbps Ethernet Media Access Controller (MAC) to the underlying physical layer.

MAC 232 processes digital network signals, and serves as an interface between a shared data path, i.e. the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mb/s CSMA/CD Ethernet applications. Physical layer 234 receives parallel data from the MII local bus 252 and converts it to serial data for transmission through connector 236 and over the network. Physical layer 234 is also responsible for wave shaping and provides analog voltages to the network. In a preferred embodiment, physical layer 234 is implemented utilizing an Integrated Services chip ICS-1890.

Physical layer 234 includes auto-negotiation logic that serves three primary purposes. First, it determines the capabilities of client computer 104. Second, it advertises its own capabilities to server computer 100. Third, it establishes a connection with server computer 100 using the highest performance connection technology.

Network adapter 230 includes encryption logic 247 which may be implemented utilizing a "hard wired" application specific integrated circuit (ASIC) or a programmed general-purpose processor which is programmed as more fully described below. Encryption processor 247 may be implemented to utilize either the TCP/IP version 6 encryption standard, or an asymmetric key encryption algorithm such as RSA.

Network adapter 230 also includes a special purpose processing unit 300 coupled to the MII bus 252 between physical layer 234 and MAC 232. Logic module 300 may be a "hard wired" application specific integrated circuit (ASIC) or a programmed general-purpose processor which is programmed as more fully described below. By coupling ASIC 300 to the MII bus 252, ASIC 300 may send and receive network packets using physical layer 234.

Data from client computer system 104 is accessed by ASIC 300 over a system management bus (SM) 238. System management bus 238 is a two-wire, low speed serial bus used to connect system management devices. This provides a path to allow software running on client 104 to access ASIC. With the trickle power supplied by signal AUX 5 239 from power supply 240, ASIC 300 is preferably powered full time.

Power supply 240 outputs a POWERGOOD signal 241 when power supply 240 outputs a stable system power. POWERGOOD signal 241 is received by encryption processor 247 and PCI-ISA bridge and power management 212. Client 104 will not power up until POWERGOOD signal 241 is received by power management 212. Prior to a receipt of POWERGOOD signal 241 by power management 212, client 104 will remain in a powered-off state even though power supply 240 may be generating full main system power 243.

POWERGOOD signal 241 is received by encryption processor 247 as an encryption signal. In this manner, encryption processor 247 receives a LOW encryption signal when client 104 is powered-off, and a HIGH encryption signal when client 104 is powered-on.

Figure 3B:
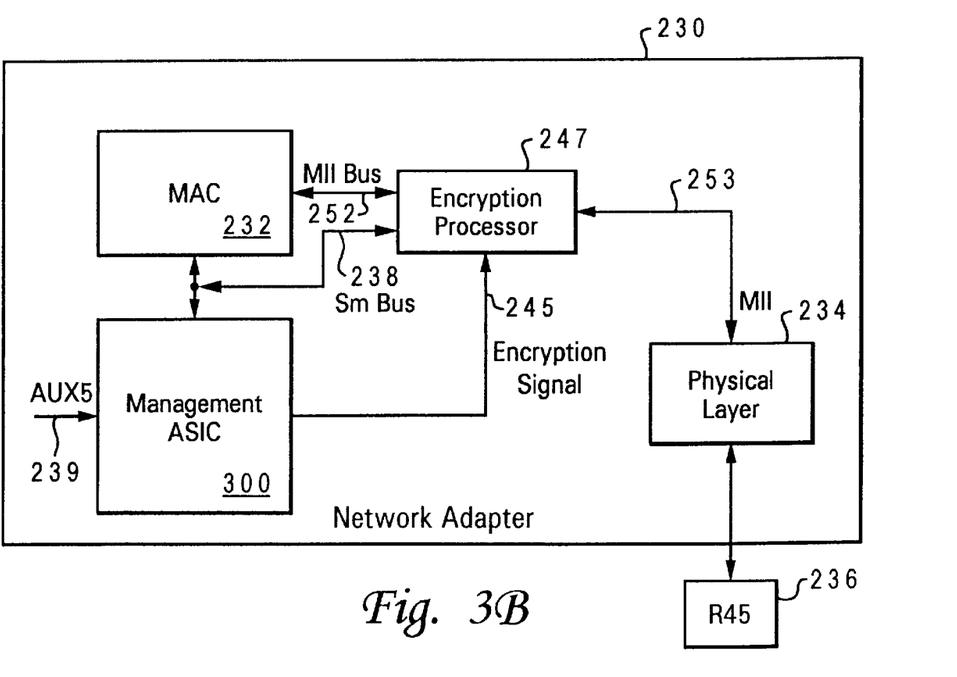
FIG. 3B depicts a more detailed pictorial representation of a second embodiment of the network adapter of FIG. 2 in accordance with the method and system of the present invention.

FIG. 3B depicts a more detailed pictorial representation of a second embodiment of the network adapter of FIG. 2 in accordance with the method and system of the present invention. In the second embodiment, instead of receiving POWERGOOD 241 as an encryption signal, encryption processor receives an encryption signal 245 from ASIC 300. ASIC 300 generates encryption signal 245 to be HIGH when client 104 is powered-on, and LOW when client 104 is powered-off. ASIC 300 receives AUX 5 signal 239 so that ASIC 300 is constantly powered even when client 104 is not receiving full system power and is powered-off.

Figure 4:
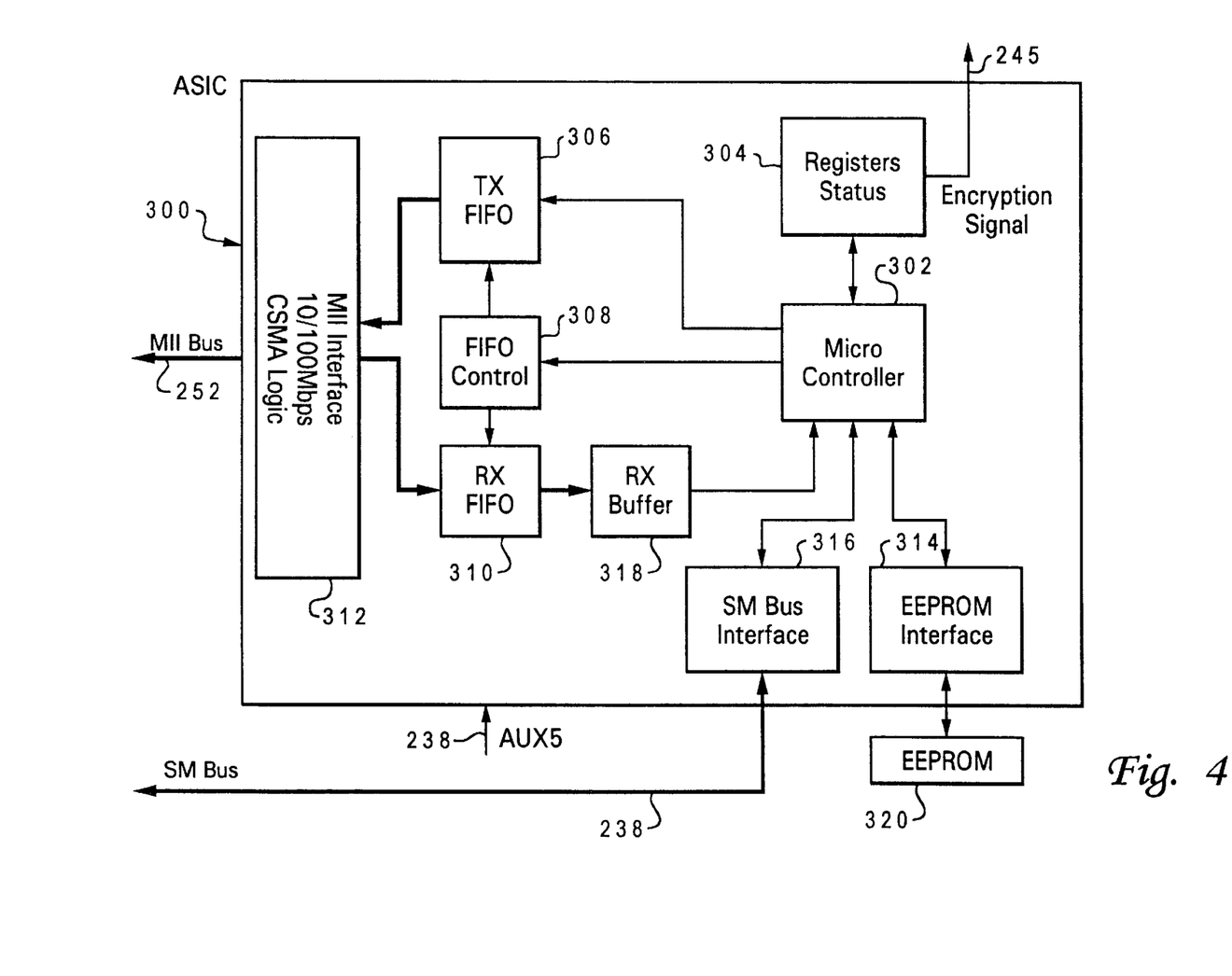
FIG. 4 illustrates a pictorial representation of a special purpose processing unit included within a network adapter included within a client computer system in accordance with the method and system of the present invention.

FIG. 4 illustrates a pictorial representation of a special purpose processing unit included within network adapter 230 included within a client computer system 104 in accordance with the method and system of the present invention. Special purpose processing unit is implemented utilizing ASIC 300 which includes a micro-controller 302 which includes several state machines to handle the following tasks: packet reception, SM bus interface, and EEPROM updates. Micro-controller 302 sends commands to FIFO control 308 to control data flow from TX FIFO 306, RX FIFO 310, and RX Buffer 318. Micro-controller 302 also responds to SM bus requests from software running on client 104 to access register status 304. Signals are received from the MII bus 252 by interface unit 312 and passed to RX FIFO 310. Register status 304 also generates encryption signal 245.

Figure 5:
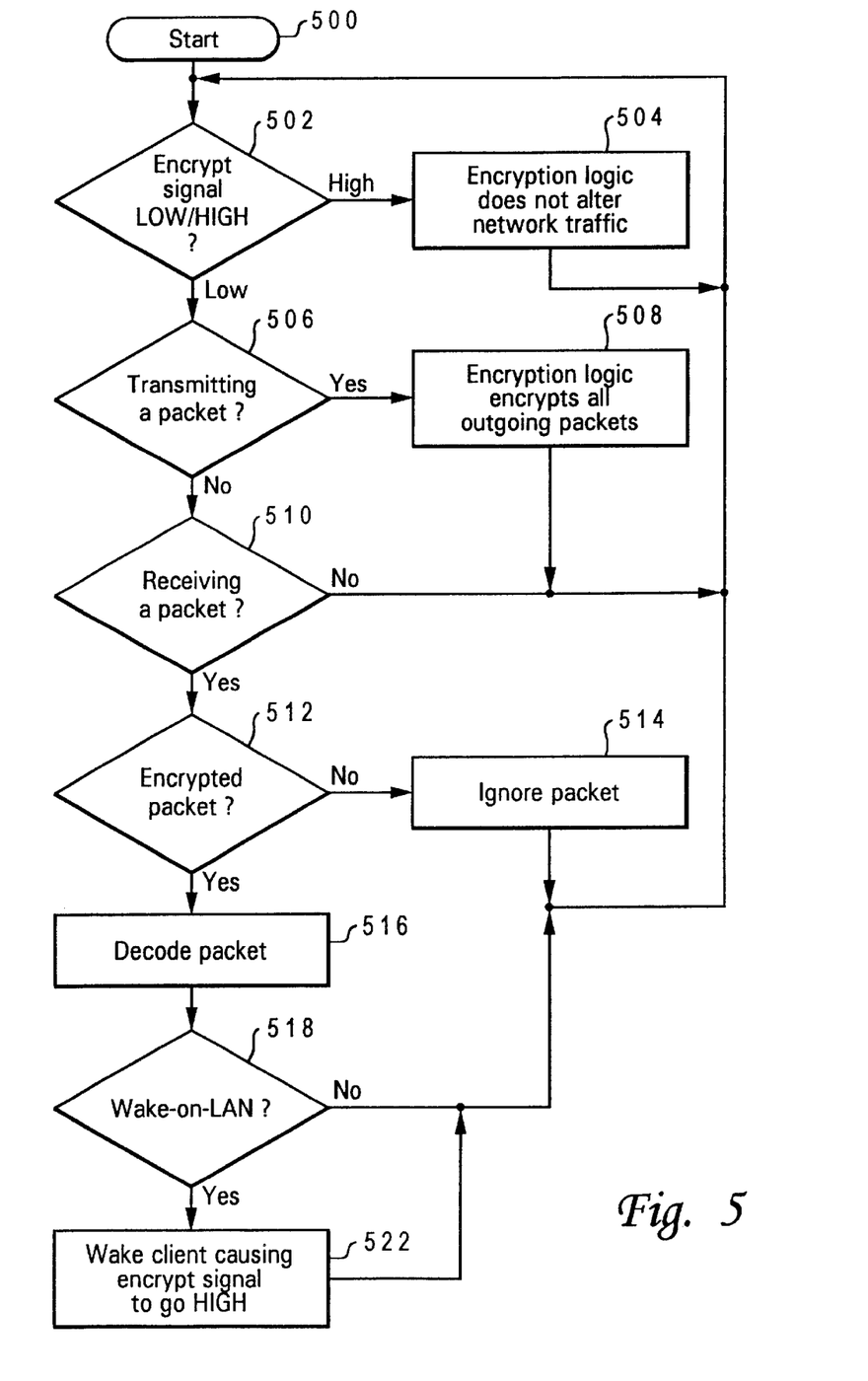
FIG. 5 depicts a high level flow chart which illustrates a powered-off client computer system responding to only valid network packets in accordance with the method and of the present invention.

FIG. 5 depicts a high level flow chart which illustrates a powered-off client computer system responding to only valid network packets in accordance with the method and system of the present invention. The process starts as depicted at block 500 and thereafter passes to block 502 which illustrates a determination of whether or not the encryption signal, either signal 241 or 245, is high or low. If a determination is made that the encryption signal is high, the client computer system is currently powered-on and the process passes to block 504 which depicts encryption logic 247 not altering any network traffic. The client computer system operates on the network normally. The process then passes back to block 502.

Referring again to block 502, if a determination is made that the encryption signal is low, the client computer system is currently powered-off and the process passes to block 506 which illustrates a determination of whether or not the client is transmitting a network packet. If a determination is made that the client is transmitting a network packet while powered-off, the process passes to block 508 which depicts encryption logic 247 encrypting all outgoing network packets. The process then passes to block 502.

Referring again to block 506, if a determination is made that the client is not transmitting a packet, the process passes to block 510 which illustrates a determination of whether or not the client computer system is receiving a network packet while powered-off. If a determination is made that the client computer system is not receiving a network packet while powered-off, the process passes to block 502.

Referring again to block 510, if a determination is made that the client computer system is receiving a network packet while powered-off, the process passes to block 512 which depicts a determination of whether or not the received packet is an encrypted packet. If a determination is made that the received packet is not an encrypted packet, the process passes to block 514 which illustrates encryption logic 247, and therefore the client computer system, ignoring the packet. In this manner, while the client computer system is powered-off, the client will not respond to any non-encrypted packets. The process then passes to block 502.

Referring again to block 512, if a determination is made that the received packet is an encrypted packet, the process passes to block 516 which depicts encryption logic 247 decoding the received, encrypted packet. Next, block 518 illustrates a determination of whether or not the received, encrypted packet is a Wake-on-LAN packet. If a determination is made that the received packet is not a Wake-on-LAN packet, the process passes to block 502.

Referring again to block 518, if a determination is made that the received, encrypted packet is a Wake-on-LAN packet, the process passes to block 522 which illustrates network adapter 230 processing the Wake-on-LAN command which causes the client computer system to be powered-on. When the client is powered-on, the encryption signal goes from low to high. The process then passes to block 502.

Figure 6:
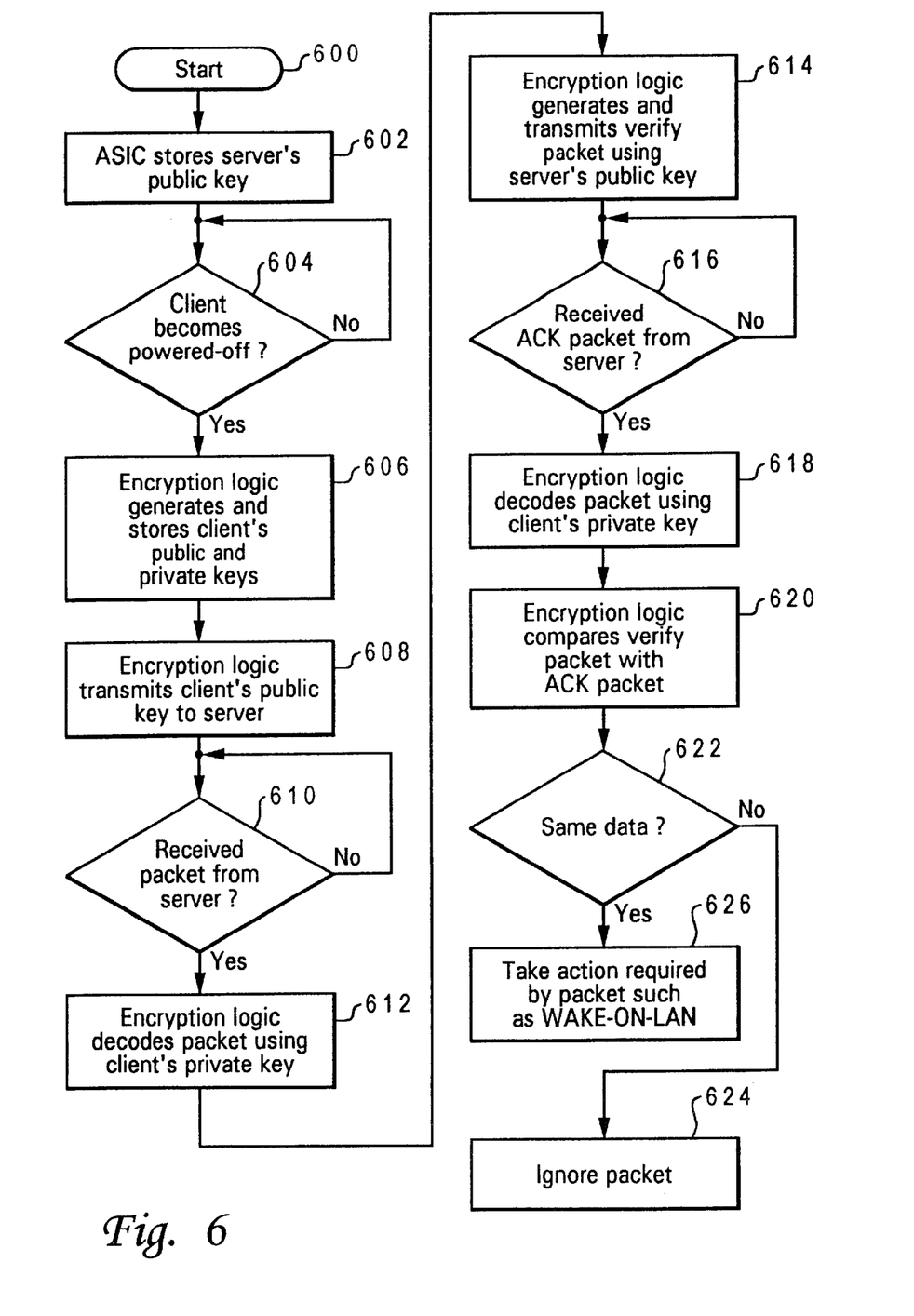
FIG. 6 illustrates a high level flow chart which depicts a client computer system determining whether a received wake network packet is valid in accordance with the method system of the present invention.

FIG. 6 illustrates a high level flow chart which depicts a client computer system determining whether a received wake network packet is valid in accordance with the method and system of the present invention. The process starts as illustrated at block 600 and thereafter passes to block 602 which depicts ASIC 300 storing the server's public key. Next, block 604 illustrates a determination of whether or not the client computer system becomes powered-off. If a determination is made that the client computer system does not become powered-off, the process passes to block 604. Referring again to block 604, if a determination is made that the client computer system does become powered-off, the process passes to block 606 which depicts encryption logic 247 generating and storing a public key and a private key pair for the client.

The process then passes to block 608 which illustrates encryption logic 247 transmitting the client's public key to the server computer system. Thereafter, block 610 depicts a determination of whether or not the client has received a packet from the server. If a determination is made that the client has not received a packet, the process passes back to block 610. Referring again to block 610, if a determination is made that the client has received a packet from the server, the process passes to block 612 which illustrates encryption logic 247, decoding the received packet utilizing the client's private key. Next, block 614 depicts encryption logic 247 generating and transmitting a verify packet to the server using the server's public key.

The process then passes to block 616 which illustrates a determination of whether or not the client has received an acknowledgement (ACK) packet back from the server. If a determination is made that the client has not received an acknowledgement packet back from the server, the process passes to block 616. Referring again to block 616, if a determination is made that the client has received an acknowledgement packet back from the server, the process passes to block 618 which depicts encryption logic 247 decoding the acknowledgement packet utilizing the client's private key. Next, block 620 illustrates encryption logic 247 comparing the verify packet data to the acknowledgement packet data.

Thereafter, block 622 depicts a determination of whether or not the verify packet data and the acknowledgement packet data are the same. If a determination is made that the data is different, the process passes to block 624 which illustrates network adapter 230 ignoring the original packet received from the server depicted in block 610. Referring again to block 622, if a determination is made that the data is the same, the process passes to block 626 which illustrates network adapter 230 taking the action required by the original packet received from the server depicted in block 610. For example, the packet may be a Wake-on-LAN packet. In this case, network adapter 230 processes the Wake-on-LAN command which causes the client computer system to be powered-on. When the client is powered-on, the encryption signal goes from low to high.

Figure 7:
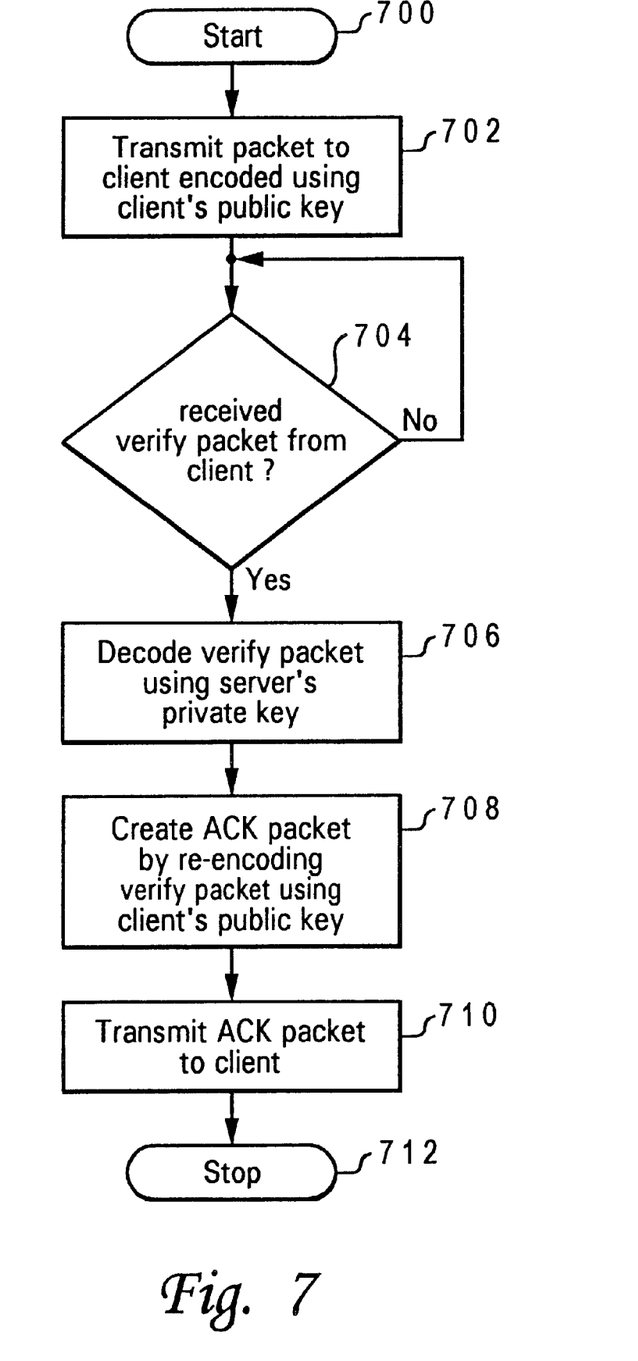
FIG. 7 depicts a high level flow chart which illustrates a server computer system transmitting a wake network packet to a client in accordance with the method and system of the present invention.

FIG. 7 depicts a high level flow chart which illustrates a server computer system transmitting a wake network packet to a client in accordance with the method and system of the present invention. The process starts as depicted at block 700 and thereafter passes to block 702 which illustrates the server computer system transmitting a packet to the client encoded using the client's public key. Thereafter, block 704 depicts a determination of whether or not the server has received a verify packet from the client. If a determination is made that the server has not received a verify packet from the client, the process passes to block 704.

Referring again to block 704, if a determination is made that the server has received a verify packet from the client, the process passes to block 706 which illustrates the server decoding the verify packet using the server's private key. Next, block 708 depicts the server creating an acknowledgement packet (ACK) by re-encoding the verify packet using the client's public key. Thereafter, block 710 illustrates the server transmitting the acknowledgement packet to the client. The process then terminates as illustrated at block 712.

While a preferred embodiment has been particularly shown and described, it will be understood by those skilled in the art that various changes in form and detail may be made therein without departing from the spirit and scope of the present invention.

What is claimed is:

1. A method in a data processing system including a server computer system coupled to a client computer system utilizing a network for causing an initially powered-off client computer system to power-on only in response to a receipt of an authenticated wake network packet, said method comprising the steps of:

said client computer system receiving a wake network packet while said client is powered-off;

said client computer system determining if said received wake network packet is a valid wake network packet while said client computer system is powered-off; and only in response to a determination that said wake network packet is a valid wake network packet, said client computer system powering-on, wherein said client computer system powers-on only in response to authenticated wake network packets;

wherein said steps further comprise:

said server computer system transmitting said wake network packet to said client computer system, said wake network packet being encoded by said server computer system utilizing said client computer system's public key;

said client computer system receiving said wake network packet while said client is powered-off;

in response to said receipt of said wake network packet, an encryption processor decoding said received wake network packet utilizing said client computer system's private key;

said encryption processor transmitting an encrypted verification packet to said server computer system, said encrypted verification packet being encoded utilizing said server computer system's public key;

said server computer system decoding said encrypted verification packet utilizing said server computer system's private key;

said server computer system re-encrypting said verification packet utilizing said client computer system's public key;

said server computer system transmitting said re-encrypted verification packet as an acknowledgement packet to said client computer system;

said encryption processor decoding said acknowledgement packet utilizing said client computer system's private key;

said encryption processor determining whether data included within said acknowledgement packet and data included within said verification packet is the same;

in response to a determination that data included within said acknowledgement packet and data included within said verification packet are the same, said client computer system powering-on; and in response to a determination that data included within said acknowledgement packet and data included within said verification packet are not the same, said client computer system ignoring said wake network packet.

2. The method according to claim 1, wherein said client computer system includes a network adapter and further comprising the step of establishing an encryption processor within said network adapter for determining if said received wake network packet is a valid wake network packet.

3. The method according to claim 2, further comprising the steps of:

said encryption processor determining if said received wake network packet is an encrypted wake network packet; and in response to said wake network packet being an encrypted wake network packet, said encryption processor determining that said received wake network packet is a valid wake network packet.

4. The method according to claim 3, further comprising the step of in response to said wake network packet not being an encrypted wake network packet, said encryption processor determining that said received wake network packet is not a valid wake network packet.

5. The method according to claim 4, further comprising the step of generating an encryption signal for indicating whether said client computer system is powered-on.

6. The method according to claim 5, said client computer system further including a power supply, and further comprising the step of said power supply generating said encryption signal.

7. The method according to claim 6, said client computer system further including a service processor within said network adapter, and further comprising the step of said service processor generating said encryption signal.

8. The method according to claim 7, further comprising the steps of:

said encryption processor receiving said encryption signal; and said encryption processor determining if said received wake network packet is an encrypted wake network packet only in response to said encryption signal indicating that said client computer system is powered-off.

9. The method according to claim 8, further comprising the steps of:

establishing a public key and a private key for said client computer system, said public key being utilized by said server computer system to encode packets transmitted to said client computer system, said private key being utilized by said client computer system to decode received packets; and establishing a public key and a private key for said server computer system, said public key being utilized by said client computer system to encode packets transmitted to said server computer system, said private key being utilized by said server computer system to decode received packets.

10. A data processing system including a server computer system coupled to a client computer system utilizing a network for causing an initially powered-off client computer system to power-on only in response to a receipt of an authenticated wake network packet, comprising:

said client computer system capable of receiving a wake network packet while said client is powered-off, said client computer system executing code for determining if said received wake network packet is a valid wake network packet while said client computer system is powered-off; and only in response to a determination that said wake network packet is a valid wake network packet, said client computer system capable of being powering-on, wherein said client computer system powers-on only in response to authenticated wake network packets, wherein said system further comprises:

said server computer system capable of transmitting said wake network packet to said client computer system, said wake network packet being encoded by said server computer system utilizing said client computer system's public key;

said client computer system capable of receiving said wake network packet while said client is powered-off;

in response to said receipt of said wake network packet, an encryption processor executing code for decoding said received wake network packet utilizing said client computer system's private key;

said encryption processor capable of transmitting an encrypted verification packet to said server computer system, said encrypted verification packet being encoded utilizing said server computer system's public key;

said server computer system executing code for decoding said encrypted verification packet utilizing said server computer system's private key;

said server computer system executing code for re-encrypting said verification packet utilizing said client computer system's public key;

said server computer system capable of transmitting said re-encrypted verification packet as an acknowledgement packet to said client computer system;

said encryption processor executing code for decoding said acknowledgement packet utilizing said client computer system's private key;

said encryption processor executing code for determinig whether data included within said acknowledgement packet and data included within said verification packet is the same;

in response to a determination that data included within said acknowledgement packet and data included within said verification packet are the same, said client computer system capable of being powering-on; and in response to a determination that data included within said acknowledgement packet and data included within said verification packet are not the same, said client computer system executing code for ignoring said wake network packet.

11. The system according to claim 10, wherein said client computer system includes a network adapter and farther comprising an encryption processor within said network adapter for determinig if said received wake network packet is a valid wake network packet.

12. The system according to claim 11, further comprising:

said encryption processor executing code for determining if said received wake network packet is an encrypted wake network packet; and in response to said wake network packet being an encrypted wake network packet, said encryption processor executing code for determining that said received wake network packet is a valid wake network packet.

13. The system according to claim 12, further comprising in response to said wake network packet not being an encrypted wake network packet, said encryption processor executing code for determining that said received wake network packet is not a valid wake network packet.

14. The system according to claim 13, further comprising said client computer system capable of generating an encryption signal for indicating whether said client computer system is powered-on.

15. The system according to claim 14, said client computer system further including a power supply, and further comprising said power supply capable of generating said encryption signal.

16. The system according to claim 15, said client computer system further including a service processor within said network adapter, and further comprising said service processor capable of generating said encryption signal.

17. The system according to claim 16, further comprising:

said encryption processor capable of receiving said encryption signal; and said encryption processor executing code for determining if said received wake network packet is an encrypted wake network packet only in response to said encryption signal indicating that said client computer system is powered-off.

18. The system according to claim 17, further comprising:

said encryption processor executing code for establishing a public key and a private key for said client computer system, said public key being utilized by said server computer system to encode packets transmitted to said client computer system, said private key being utilized by said client computer system to decode received packets; and said encryption processor executing code for establishing a public key and a private key for said server computer system, said public key being utilized by said client computer system to encode packets transmitted to said server computer system, said private key being utilized by said server computer system to decode received packets.

* * * * *